Patented Apr. 26, 1938

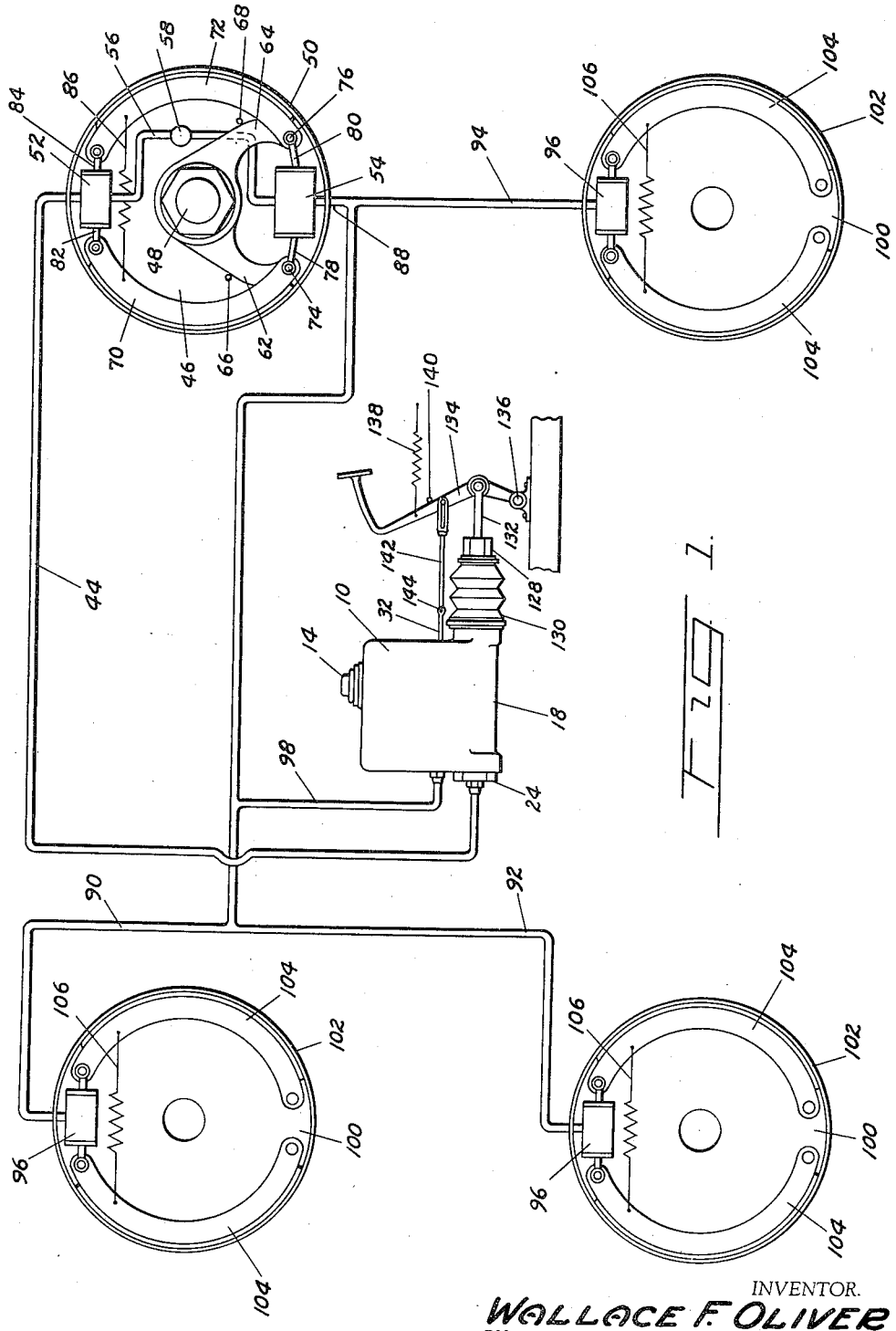

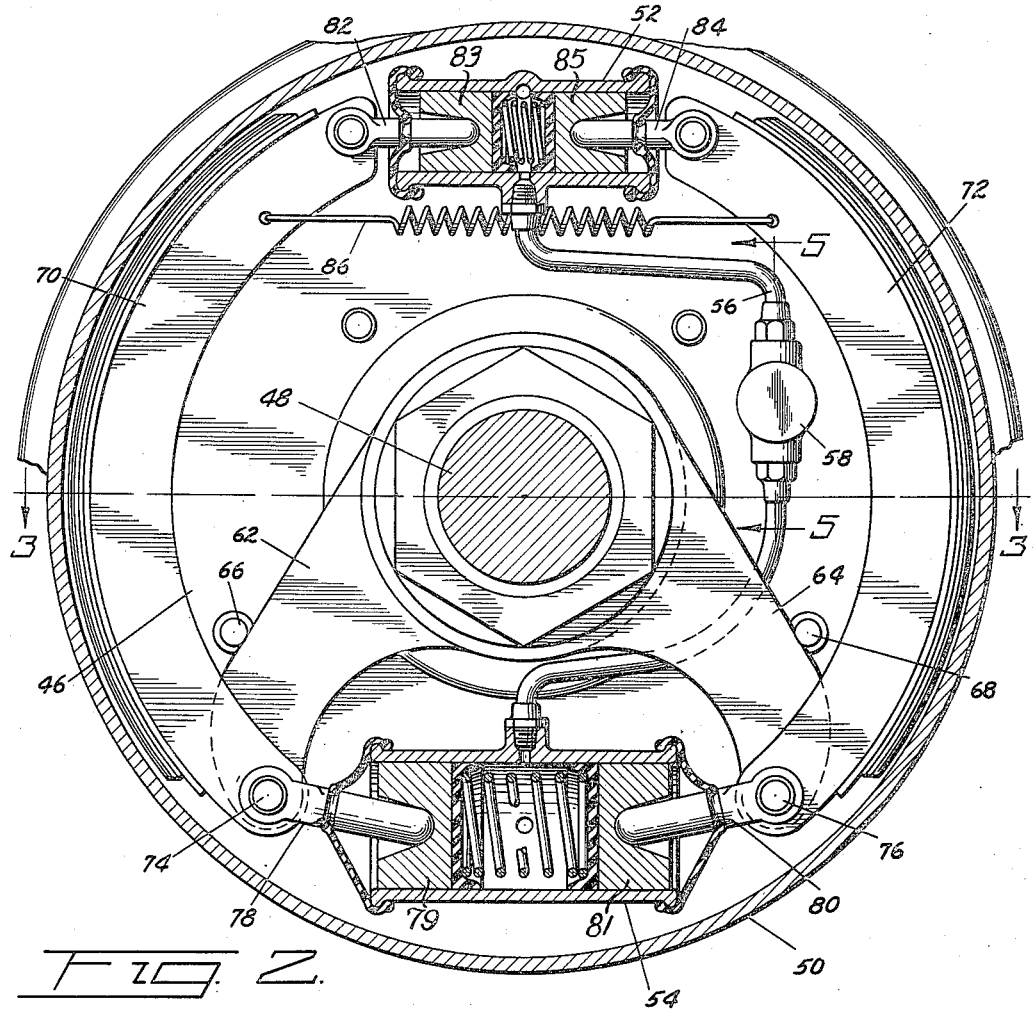
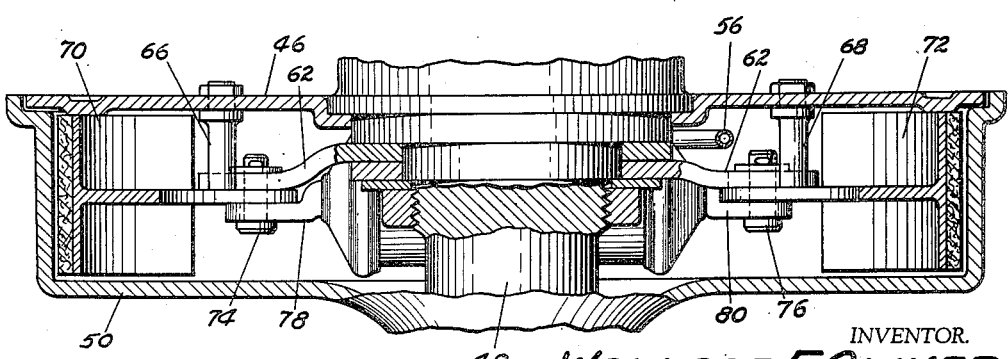

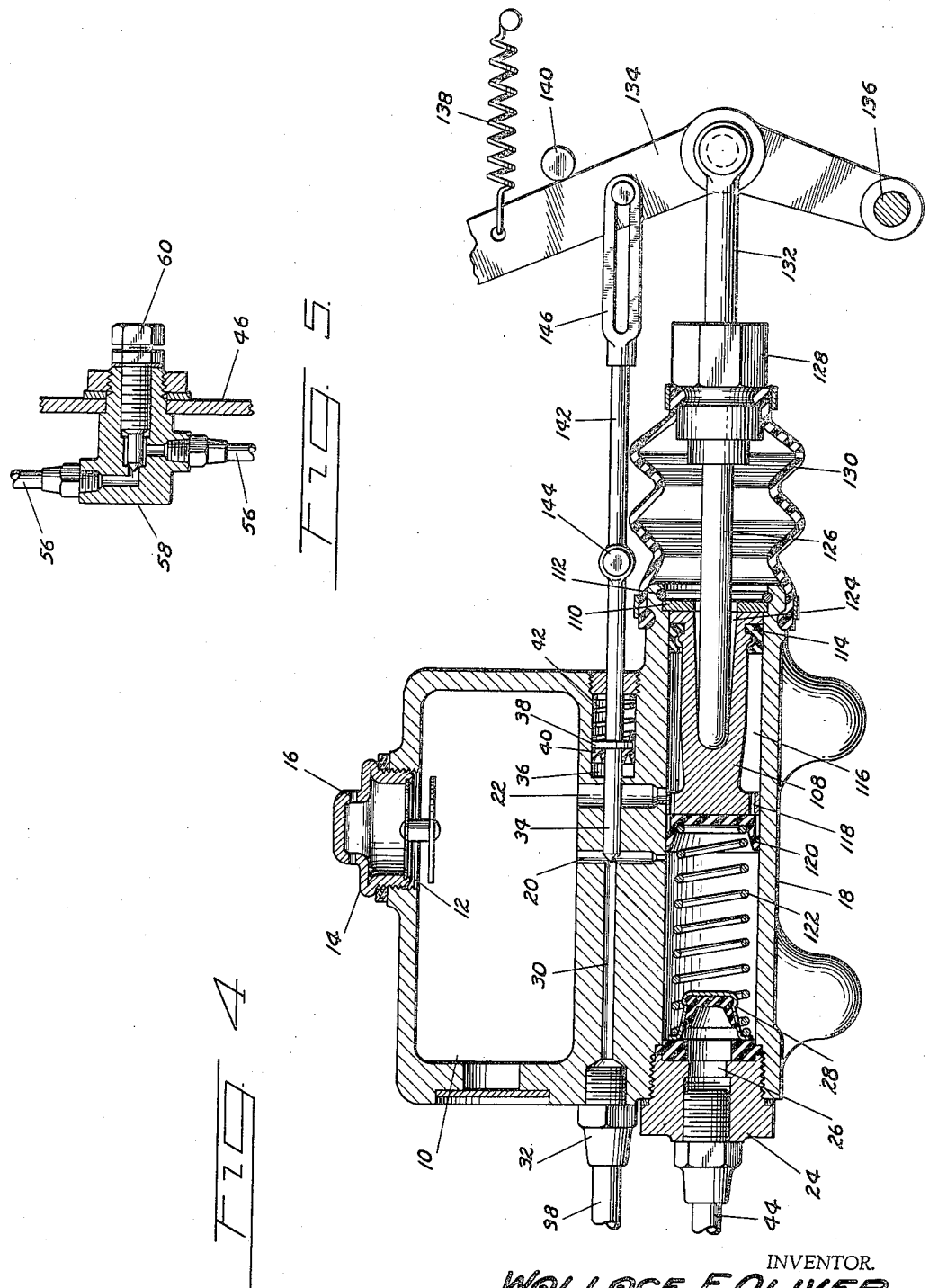

2,115,230

UNITED STATES PATENT OFFICE 2,115,230

BRAKING SYSTEM

Wallace F. Oliver, Detroit, Mich., assignor to Hydraulic Brake Company, Detroit, Mich., a corporation of California Application February 27, 1936, Serial No. 65,960

6 Claims. (Cl. 188—152)

This invention relates to fluid pressure braking systems for motor vehicles and more particularly to such systems wherein the force utilized to apply the brakes associated with certain wheels of the vehicle is created by torque set up upon applying the brakes associated with a driven wheel of the vehicle.

While systems of this particular type are well known in the art, none of those in use have proved generally satisfactory due to the inefficiency of the particular type of fluid pressure producing devices used in connection with the systems.

It is the aim of the present invention to provide a fluid pressure producing device suitable for successfully operating a fluid pressure braking system for a motor vehicle wherein the force utilized to actuate certain of the brakes is derived from the torque created by the brake associated with the driven wheel of the vehicle.

Other objects and advantages of the invention will appear from the following description taken in connection with the drawings which form a part of this specification, and in which:—

Fig. 1 is a schematic view of a brake system embodying the invention;

Fig. 2 is a vertical sectional view of the brake structure;

Fig. 3 is a sectional view substantially on line 3—3, Fig. 2;

Fig. 4 is a vertical sectional view of the fluid pressure producing device; and Fig. 5 is a sectional view substantially on line 5—5, Fig. 2.

Referring to the drawings for more specific details of the invention, 10 represents a fluid reservoir having a filling opening 12 which may be closed as by a plug 14 having openings 16 for venting the reservoir to the atmosphere. A cylinder 18 at the base of the reservoir has ports 20 and 22, providing communications between the cylinder and the reservoir, and a head 24 having a concentric opening 26 providing a discharge port for the reservoir, and the discharge port is controlled as by a two-way valve 28.

A passage 30 is arranged intermediate the reservoir and the cylinder. The passage extends from the port 20 to a suitable connection 32 and is controlled by a spring-pressed plunger 34. As shown, the plunger extends through a chamber 36 also arranged between the reservoir and the cylinder. A collar 38 on the plunger within the chamber provides a suitable seat for a leak-proof cup 40 which insures against seepage of fluid from the reservoir, and a spring 42 interposed between the collar and the head of the chamber urges the plunger to its seat to effectively close the passage 30.

A fluid pressure delivery pipe or conduit 44 connects the discharge port 26 of the cylinder 18 to a hydraulically actuated brake structure. The brake structure includes a fixed support or backing plate 46, suitably mounted on an axle 48 or an axle housing, with the axle extending concentrically through the backing plate, and a rotatable drum 50 associated with the backing plate which may be suitably secured to a wheel of the vehicle. Fluid pressure actuated motor 52 and the fluid compressor 54 are mounted diametrically on the backing plate. These devices are interconnected by a pipe line or conduit 56 having coupled therein a fitting 58 including a bleeder screw 60 normally turned down to close the communication between the devices; and the motor 52 is suitably connected to the fluid pressure delivery pipe 44.

Corresponding arms 62 and 64 are pivotally mounted on the axle 48 and are respectively limited in movement in one direction only by suitable stops 66 and 68 arranged on the backing plate. Interchangeable friction elements or shoes 70 and 72 have their respective articulate ends pivoted to the respective ends of the arms 62 and 64 by suitable pivot pins 74 and 76 on which are supported corresponding thrust pins 78 and 80 engaging respectively the opposed pistons 79 and 81 of the fluid compressor 54. The separable ends of the shoes have pivoted thereto thrust pins 82 and 84 engaging respectively the respective opposed pistons 83 and 85 of the fluid pressure actuated motor 52, and a retractile spring 86 is connected between the shoes.

A fluid pressure delivery pipe or conduit 88 connected to the fluid compressor 54 has branches 90, 92 and 94 connected respectively to fluid pressure actuated motors 96 for the actuation of the brakes associated with the remaining wheels of the vehicle, and a branch 98 connected by the fitting 32 to the passage 30. These particular brakes are of conventional type and each includes a fixed support or backing plate 100, a rotatable drum 102 associated therewith, corresponding friction elements or shoes 104 pivotally mounted on the backing plate, and a fluid pressure actuated motor corresponding to the motors 96 mounted on the backing plate between the shoes and operative to spread the shoes into engagement with the drum against the resistance of a retractile spring 106 connecting the shoes.

A piston 108 reciprocable in the cylinder 18 is held against displacement by a washer 110 seated on a shoulder in the open end of the cylinder and secured in place by a retaining ring 112 fitted in a continuous groove in the wall of the cylinder. The skirt of the piston has thereon a leak-proof washer 114 which inhibits the seepage of fluid from the cylinder. The body of the piston is reduced in cross section to provide in conjunction with the wall of the cylinder an annular chamber 116 communicating with the reservoir 10 by way of the port 22, and the head of the piston has a plurality of spaced ports 118 providing communications between the annular chamber 116 and that portion of the cylinder forward of the piston. A collapsible leak-proof cup 120 seated on the head of the piston controls the ports 118, and a spring 122 interposed between the cup 120 and the two-way valve 28 serves to retain these elements against displacement and also to return the piston to its retracted position.

The piston 108 has in its back a recess 124 for the reception of one end of a thrust pin 126, and the other end of the pin 126 supports a coupling 128 connected by a flexible boot 130 to the open end of the cylinder for excluding from the cylinder dust and other foreign substances.

The coupling 128 is connected by a rod 132 to a foot pedal lever 134 journaled on a shaft 136. A retractile spring 138 connects the lever to a fixed support and serves to return the lever to its retracted position against a suitable stop 140, and a rod 142 pivoted as at 144 to the plunger 34 is coupled to the lever 134 by a lost motion connection 146.

When it is desired to apply the brakes, the operator depresses the foot pedal lever 134. Upon this movement of the lever, force is transmitted therefrom through the rod 132 and the thrust pin 126 to the piston 108 to move the piston on its compression stroke. Simultaneously with this movement, the plunger 34 is released, and the spring 42 becomes effective to urge the plunger to its seat to close the passage 30. During the initial movement of the piston 108, the collapsible leak-proof cup 120 on the head thereof closes the port 20, and upon further movement of the piston on its compression stroke fluid is displaced from the cylinder 18 through the fluid pressure delivery pipe or conduit 44 to the fluid pressure actuated motor 52, causing actuation of this motor with the resultant spreading of the shoes 70 and 72 into engagement with the drum 50 against the resistance of the retractile spring 86.

Upon engaging the shoes 70 and 72 with the drum 50, the torque created by the brake is transmitted through the thrust pins 78 or 80, (according to direction of drum rotation), to the fluid compressor 54, causing actuation of this motor with the resultant displacement of fluid therefrom through the fluid pressure delivery pipe or conduit 88 and its branches into the fluid pressure actuated motors 96. During this movement the passage 30 is closed by the spring-actuated plunger 34. The fluid enters the motors 96 causing actuation of the motors with the resultant spreading of the shoes 104 into engagement with the drum 102 against the resistance of the retractile spring 106.

Upon release of the foot pedal lever 134 the retractile spring 138 becomes effective to return the pedal to its retracted position against the stop 140. As the foot pedal lever returns to its retracted position, the rod 132 and thrust pin 126 are retracted resulting in releasing the piston. Simultaneously with this movement the lost motion connection 146 between the foot pedal lever and the rod 142 is taken up, and the plunger 34 is retracted against the resistance of the retractile spring 42 so as to open the passage 30. Upon release of the piston 108, it is returned to its retracted position under the influence of the spring 122. As the piston 108 returns to its retracted position, a partial vacuum is created in the cylinder 18 forward of the piston. This results in drawing fluid from the reservoir through the port 22 into the annular chamber 116, thence through the ports 118 in the head of the piston past the collapsible leak-proof cup 120 into that portion of the cylinder forward of the piston. During this period fluid is returned to the cylinder from the fluid pressure actuated motor 52 under the influence of the retractile spring 86. Should the quantity of fluid received by the cylinder be in excess of that required to completely fill the cylinder, the excess fluid is returned to the reservoir by way of the compensating port 20.

Simultaneously with this operation fluid is returned from the motors 96 to the compressor 54 under the influence of the retractile springs 106. During this period the plunger 34 is retracted so as to establish communication between the reservoir 10 and the compressor 54 and motors 96 to the end that leakage and volumetric changes of the fluid due to temperature variations may be compensated for. At the conclusion of this operation the braking system is again in position for a subsequent operation.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure braking system comprising a reservoir, a cylinder, a fluid compressor, a conduit connecting said reservoir thereto, a spring pressed plunger controlling said conduit, said cylinder being arranged at the base of the reservoir in parallel relation to said conduit, a piston reciprocable in the cylinder, an operating lever for advancing the piston, a spring for returning the piston, a rod pivotally connected to the plunger, and a lost-motion connection between the rod and the operating lever.

2. A fluid pressure braking system comprising a fluid reservoir having a passage in its base providing communication between the exterior of the device and interior of the reservoir, a spring-pressed plunger for control of the passage, a cylinder having ports providing communications between the cylinder and the reservoir, independent fluid pressure actuated mechanism operatively connected to the cylinder and the passage respectively, a piston reciprocable in the cylinder, an operating lever for advancing the piston, a spring for returning the piston, and means connecting the plunger to the operating lever.

3. A fluid pressure braking system comprising a fluid reservoir having in its base a passage providing communication between the exterior and interior of the reservoir, a spring-pressed plunger controlling the passage, a cylinder supplied from the reservoir, a fluid pressure actuated motor operatively connected to the cylinder, a compressor associated therewith, fluid pressure actuated motors communicating with said compressor and said passage, a piston reciprocable in the cylinder, an operating lever for advancing the piston, a spring for returning the piston, a rod connected to the plunger, and a lost-motion connection between the rod and the operating lever.

4. A fluid pressure braking system comprising a fluid reservoir having a passage in its base providing communication between the exterior and interior of the reservoir, a spring-pressed plunger for control of the passage, a cylinder supplied from the reservoir, a fluid pressure actuated motor operatively connected to the cylinder, friction elements actuated by the motor, a pressure producing element actuated by the friction elements, a plurality of fluid pressure actuated motors connected to the pressure producing element and to the passage communicating with the reservoir, a piston reciprocable in the cylinder, an operating lever for advancing the piston, a spring for returning the piston, a rod pivotally connected to the plunger, and a lost-motion connection between the rod and the operating lever.

5. A fluid pressure system of the class described, comprising a reservoir, a cylinder, a conduit providing communication between the cylinder and the reservoir, a piston reciprocable in the cylinder, an actuator for the piston to discharge fluid from said cylinder under pressure, means actuated by the fluid thus displaced, a second compression cylinder, means including a conduit connecting said last named cylinder with said reservoir, a plunger adapted to close said conduit, means operatively connecting the plunger with the actuator, and operating means for the second cylinder.

6. A fluid pressure system of the class described, comprising a reservoir, a cylinder, a conduit providing communication between the cylinder and the reservoir, a piston reciprocable in the cylinder, an actuator for the piston to discharge fluid from said cylinder under pressure, means actuated by the fluid thus displaced, a second compression cylinder, means including a conduit connecting said last named cylinder with said reservoir, a spring pressed plunger controlling the conduit, a lost-motion connection between the plunger and the actuator, and an operating means for the second cylinder.

WALLACE F. OLIVER.